Figure 1:
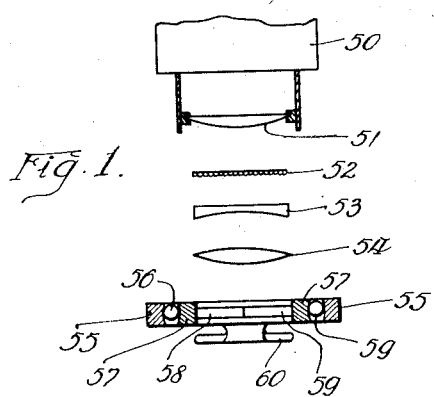

Sept. 25, 1934.    A. HERZ    1,974,653
PHOTOGRAPHY
Filed April 24, 1929

Inventor:
Alfred Herz.
By Brown, Jackson, Boettcher + Dienner
Attys

Patented Sept. 25, 1934

1,974,653

UNITED STATES PATENT OFFICE 1,974,653

PHOTOGRAPHY

Alfred Herz, Chicago, Ill.

Application April 24, 1929, Serial No. 357,612

13 Claims. (Cl. 88—16.6)

This invention relates to motion picture cameras and projectors, more particularly to attachments placed on those cameras to convert them into stereoscopic cameras.

In my copending application, Serial No. 332,345, filed January 14, 1929, I disclose a stereoscopic motion picture system employing a motion picture film having one face smooth and one face formed in cylindrical sections lying parallel to each other and running lengthwise of the film. In this application I also disclose a reflecting system which, when placed on an ordinary motion picture camera, converts that camera into a stereoscopic camera in which this cylindrical faced film can be exposed to record stereoscopic motion pictures.

It will be apparent that if a stereoscopic motion picture film is to be exposed in a system of this kind, the reflecting system must be maintained in alignment with the cylindrical surface of the film if the pictures are to be recorded thereon without distortion.

The prism or reflecting system cooperates with the cylindrical surface of the film, which surface acts as a lens, to break the picture up into a plurality of vertically disposed sections. If the system gets out of alignment with the axis of the cylindrical surface of the film, the images recorded will not bear the proper relation to each other, and the pictures will, as a result, be badly distorted.

In the projection of stereoscopic motion pictures recorded on a cylindrical faced film, it is equally important that the color filter or screen for differentiating light of different characteristics on the projecting machine be maintained with the dividing line between its complementary sections lying along a vertical line. The camera must be leveled in order to project the picture squarely upon the viewing screen, and when the camera is so leveled the axes of the cylindrical sections on the film will be in a vertical line. If the differentiating screen on the projecting machine is maintained with the dividing line between its complementary sections lying along a true perpendicular, it will be properly aligned and the picture recorded upon the film will be properly projected to the viewing screen without any distortion, and when viewed through complementary mats held before the two eyes of an observer, will faithfully reproduce the stereoscopic effect of depth and distance.

Accordingly, as a further object of my invention I have provided a new mounting for the screen or filter to be placed upon the stereoscopic projector, a mounting which positively maintains a vertical alignment of the dividing line between its two sections.

Figure 2:
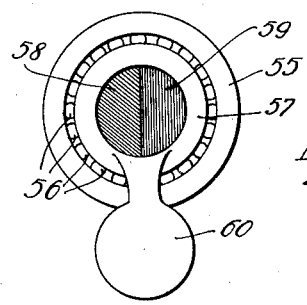

To acquaint those skilled in the art with the teachings of my invention, I have illustrated a preferred embodiment of it in the accompanying drawing forming a part of this specification. In the drawing:

Figure 1 is a diagrammatic view of the projecting system showing the arrangement of the improved differentiating screen forming a part of my invention; and Figure 2 is a detailed elevation view of the improved differentiating screen.

In the projection of stereoscopic pictures, the light from the light source encased in the lamp house 50 in Fig. 1 is collected by the condenser 51 and directed through the cylindrical faced film 52, through the lenses 53 and 54, through the color mat system 58 and 59 on to the viewing screen. It is important that the dividing line between the color mat 58 and 59 be maintained vertical if the images on the screen are to be properly colored, because the projector is normally carefully leveled before operation so that the projected picture will be properly displayed. The longitudinal grooves on the film are therefore brought to a vertical position.

It is necessary, in addition, to properly focus the lens or condenser system and this is usually done by moving one of the lens toward or away from the others by turning its screw threaded mounting tube, as is well known in the art. Hence the color mat system 58 and 59, or any other light modifying system which must be aligned with the longitudinal grooves on the film, cannot be secured directly to the lens mounting as would be convenient because focusing the lens would throw the color mat system off. Therefore the present invention contemplates rotatably mounting the color mat assembly for free movement on the lens system and to position the mats by gravity and independent of the lens focusing system or any other guide means on the machine.

To accomplish this arrangement I mount the color filter 58 and 59 in the ring 57, the outer surface of which is made concave to embrace the ball-bearings 56. A ball-bearing race 55 is disposed outside of the ring 57 and the ring held therein by the ball-bearings 56.

Attached to the ring 57 is the depending weight 60 which hangs outward from the lenses of the projector and downward to thereby hold the color mat 58 and 59 in their proper position. Since the ring 57 is ball-bearing mounted, it is free to rotate and the force of gravity acting upon the weight 60 will always maintain the ring in such a position that the dividing line between the filter 59 is vertical. The projector must be level to properly project the pictures on the viewing screen, and when it is leveled the cylindrical axes of the film will be in vertical positions. With the filter likewise arranged in a vertical position, the component parts of the picture on the viewing screen are in the proper complementary colors, so that when viewed through a pair of color mats held before the two eyes of the observer, they will accurately portray the stereoscopic effect of depth and distance.

While I have shown and described a preferred embodiment of my invention I have done so by way of example only as there are many modifications and adaptations which can be made by one skilled in the art without departing from the scope of the invention.

Having thus complied with the statutes and shown and described a preferred embodiment of my invention, what I consider new and desire to have protected by Letters Patent, is pointed out in the appended claims.

What is claimed is:

1. In a motion picture projector, a film, light differentiating screen comprising complementary sections, a mounting for holding said screen a fixed distance from said film, said mounting permitting rotation of said screen in the plane of the mounting, and means including a depending weight for rotating the screen to vertically align it.

2. In a motion picture projector, a light differentiating screen comprising complementary sections, a mounting ring surrounding said sections, a ball race surrounding said ring, ball-bearings supporting said ring in said race, and a weight depending from said ring and movable with the ring to align said screen sections in a vertical plane.

3. Photographic apparatus comprising a lens system, a light differentiating screen rotatably mounted with respect thereto, and an eccentrically disposed weight associated with said screen to maintain the same in vertical position irrespective of the position of the lens system.

4. Photographic apparatus comprising a lens system, a light differentiating screen comprising a pair of vertically aligned sections, a mounting ring in which said sections are secured, means rotatably mounting said ring with respect to the lens system, and a weight depending from said ring and movable with the ring to align said screen sections in a vertical plane.

5. In a motion picture system, a cylindrical faced film disposed with the axes of the cylinders lying vertically, a lens disposed ahead of said film, a light modifying system mounted ahead of said lens and arranged to be aligned with the axes of said film, said system being rotatable around the axis of said lens, and gravity operated means for maintaining said system aligned with the axes of said film.

6. In a motion picture system, a cylindrical faced film normally disposed with the axes of the cylinders lying vertically, a rotatably mounted light modifying system mounted ahead of said film and requiring alignment with the axes of said cylinders and gravity operated means for rotating said system for maintaining its proper alignment with the axes of said cylinders.

7. In photographic apparatus, the combination of an objective, a mount for the objective in which the objective is rotatably supported for focusing, a banded filter adapted to be mounted on the objective, means for holding the filter at a fixed distance with respect to the objective and means including a weight to retain the filter bands in a vertical position.

8. A filter attachment adapted to be rotatably mounted on photographic apparatus and having its center of gravity spaced from its axis of rotation and its axis of rotation at the optical axis of the photographic apparatus.

9. In a combination, a lens mount, an objective adjustable relative to the lens mount, a filter attachment having a zoned filter, and means including a weight for retaining the zoned filter in predetermined position.

10. A filter attachment including a freely rotatable filter element, and means associated with said filter element for automatically rotating it to a predetermined position while maintaining the periphery of said element in a given position.

11. A filter attachment comprising a filter holder, a zoned filter carried by said holder and freely rotatable thereon, and a weight associated with said zoned filter for holding it in predetermined relation relative to the earth.

12. In combination, optical projection apparatus, an objective therefor, a mount for the objective in which the objective is rotatably supported for focusing, a banded filter adapted to be mounted on the objective, means for holding the filter at a fixed distance with respect to the objective, and means including a weight to retain the filter bands in a vertical position.

13. In combination, optical projection apparatus, and a filter attachment adapted to be rotatably mounted on said optical projection apparatus and having its center of gravity spaced from its axis of rotation and its axis of rotation at the optical axis of said apparatus.

ALFRED HERZ.